US009594819B2

(12) United States Patent
Chao (10) Patent No.: US 9,594,819 B2
(45) Date of Patent: Mar. 14, 2017

(54) WIRELESS SYSTEM WITH DATABASE TRANSFER MECHANISM AND METHOD OF OPERATION THEREOF

(71) Applicant: Telenav, Inc., Sunnyvale, CA (US)

(72) Inventor: Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 394 days.

(21) Appl. No.: 14/303,337

(22) Filed: Jun. 12, 2014

(65) Prior Publication Data

US 2015/0363479 A1    Dec. 17, 2015

(51) Int. Cl.
  *G06F 17/30* (2006.01)
  *G01C 21/26* (2006.01)
(52) U.S. Cl.
  CPC ....... *G06F 17/30575* (2013.01); *G01C 21/26* (2013.01); *G06F 17/30241* (2013.01); *G06F 17/30345* (2013.01)
(58) Field of Classification Search
  CPC ......... G06F 17/30575; G06F 17/30241; G01C 21/26; H04L 43/0817; H04L 41/0627
  See application file for complete search history.

(56) References Cited

U.S. PATENT DOCUMENTS

| 6,965,674 | B2 * | 11/2005 | Whelan ............... H04L 9/0891 380/270 |
| 7,664,501 | B2 | 2/2010 | Dutta et al. |
| 8,145,210 | B2 | 3/2012 | Thalanany et al. |
| 8,150,925 | B2 * | 4/2012 | Zimmers .............. G08B 27/005 709/206 |
| 8,306,955 | B2 | 11/2012 | Walker et al. |
| 8,355,387 | B2 | 1/2013 | Qin et al. |
| 8,379,528 | B1 | 2/2013 | Xue et al. |
| 8,811,995 | B2 * | 8/2014 | Melia ................. H04L 61/2015 455/436 |
| 2006/0146767 | A1 | 7/2006 | Moganti |
| 2008/0200154 | A1 | 8/2008 | Maharajh et al. |
| 2009/0274166 | A1 | 11/2009 | Zhang et al. |

OTHER PUBLICATIONS

Sumit Roy, Bo Shen, and Vijay Sundararm, "Application Level Hand-off Support for Mobile Media Tanscoding Sessions", NOSSDAV'02, May 12-14, 2002 Miami, Florida.
C.M. Huang and C.H. Lee, "Layer 7 Multimedia Proxy Handoff Using Anycast/Multicast in Mobile Networks", Moble Computing, IEEE Transactions on, vol. 6 pp. 411-422, 2007.

* cited by examiner

*Primary Examiner* — Cheryl Lewis
(74) *Attorney, Agent, or Firm* — IP Investment Law Group (57) ABSTRACT

A method of operation of a wireless system includes: receiving a notification packet through a wireless channel; calculating a retrieval route based on the content of the notification packet including identifying a final WLAN hub accessible form the retrieval route; transferring an update database while travelling the retrieval route including receiving a final update packet from the final WLAN hub through the wireless channel; and loading a storage unit with the content of the update database including copying the content to a display interface for displaying on a device.

20 Claims, 5 Drawing Sheets

WIRELESS SYSTEM WITH DATABASE TRANSFER MECHANISM AND METHOD OF OPERATION THEREOF

TECHNICAL FIELD

An embodiment of the present invention relates generally to an automotive communication system, and more particularly to an automotive communication system for managing database updates.

BACKGROUND

Modern consumer and industrial electronics, especially devices such as global positioning systems, smart phones, vehicle electronics, cellular phones, portable digital assistants, computer systems, and combination devices, are providing increasing levels of functionality to support modern life including updates of reference data for maintaining the latest capabilities. Research and development in the existing technologies can take a myriad of different directions.

Today's vehicles can be considered a rolling server farm. There are information and entertainment systems, motor control and operation systems, collision avoidance systems, safety device control systems, and vehicle monitoring systems. These systems do everything from alerting the driver to an open door to parallel parking the vehicle on its own without driver intervention. The operation of these systems can be altered by applying an update to their operating code. The updates can be offered for ease of use, to address security issues, to repair flaws in the operational sequence, or to enable new or extended features of the hardware platform.

When an operational safety flaw is detected in a vehicle, the manufacturer can issue a recall that requires the drivers of the recalled vehicle to bring their vehicle to a service/repair facility for installation and verification of the update. The service/repair facility can download a proprietary code to change the operation of the system in question and apply the update to the electronic device that supports the system within the vehicle. In most cases, that would mean connecting the device to a central server in order to access the update for download and installation. The coupling of the central server can be performed through a proprietary network, most commonly at service/repair facility. This is not a convenient option for the owner of the vehicle.

The newest models of automobiles have entered the world of updates to intelligence functions of the vehicle. These updates can be costly and time consuming because they require the vehicle to be in the possession of the manufacturer service/repair facility for an extended period of time, on the order of a full day. As computer users can verify, one update can often lead to another to resolve some unforeseen issue.

Thus, a need still remains for a wireless system with database transfer mechanism to maintain vehicle capabilities in a changing environment. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a wireless system including: receiving an update database; assembling a notification packet for the update database including: generating a transfer key code for accessing the update database, encrypting, with an encryption seed, the update database, and providing a database size for the update database; and transferring the notification packet to a device.

An embodiment of the present invention provides a method of operation of a wireless system including: receiving a notification packet through a wireless channel; calculating a retrieval route based on the content of the notification packet including identifying a final WLAN hub accessible form the retrieval route; transferring an update database while travelling the retrieval route including receiving a final update packet from the final WLAN hub through the wireless channel; and loading a storage unit with the content of the update database including copying the content to a display interface for displaying on a device.

An embodiment of the present invention provides a wireless system, including: a communication interface for receiving a notification packet; a control unit, coupled to the communication interface, for calculating a planned route based on the content of the notification packet; a controller interface, coupled to the communication interface, for transferring an update database while travelling the planned route; and a storage unit, coupled to the control unit, loaded with the content of the update database for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. The term "WLAN hub" referred to herein means an access point of a high bandwidth wireless network having a central hub of communication.

Figure 1:
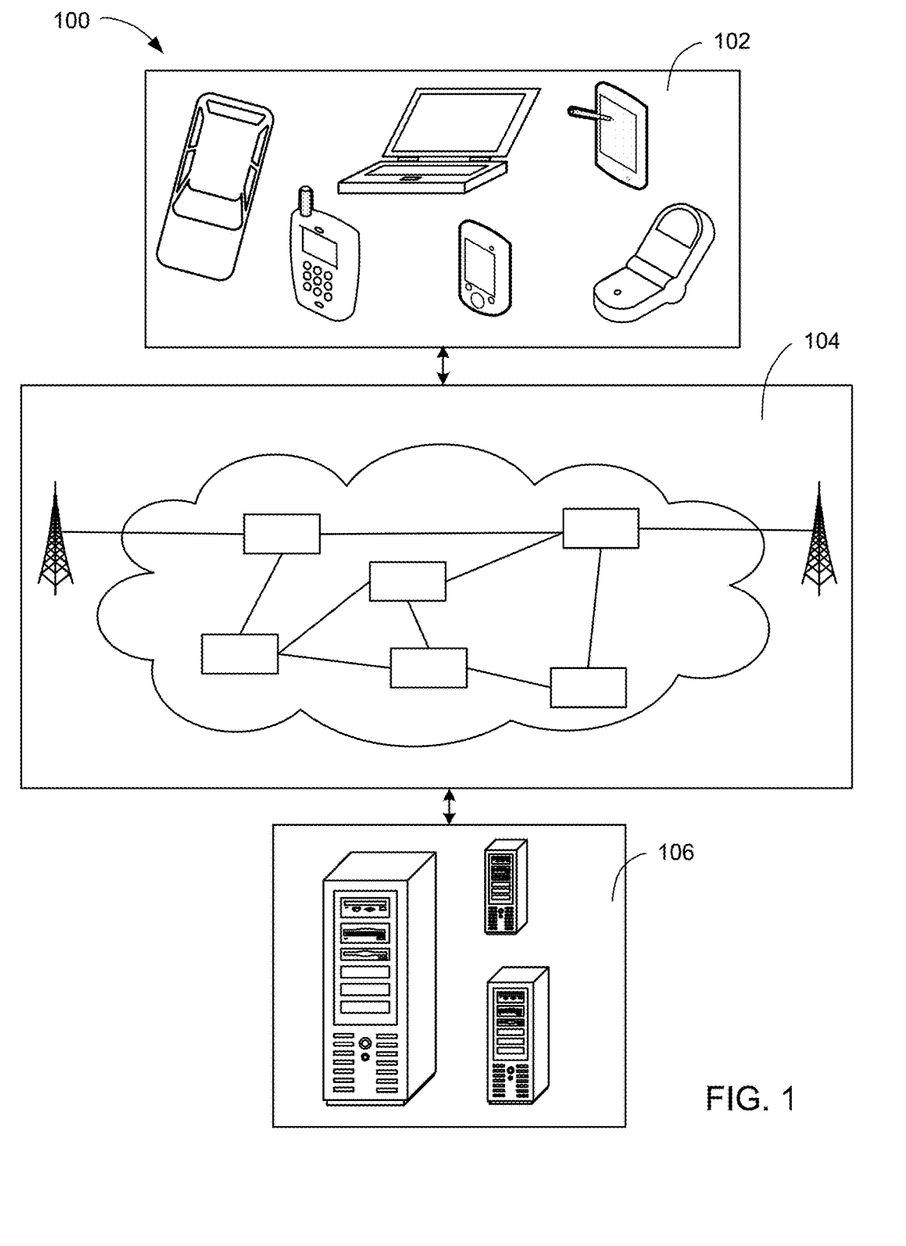
FIG. 1 is a wireless system with database transfer mechanism in an embodiment of the present invention.

Referring now to FIG. 1, therein is shown a wireless system 100 with database transfer mechanism in an embodiment of the present invention. The wireless system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of wireless devices, such as a cellular phone, personal digital assistant, a notebook computer, an automobile, or other multi-functional wireless or entertainment device. The first device 102 can couple, either directly or indirectly, to the communication path 104 to communicate with the second device 106 or can be a stand-alone device.

For illustrative purposes, the wireless system 100 is described with the first device 102 as a vehicle communication device, although it is understood that the first device 102 can be different types of devices. For example, the first device 102 can also be an automobile having a network of electronic components including a radio, a navigation system, communication system, a motor control system, a safety control system, and a central control system.

The second device 106 can be any of a variety of centralized or decentralized computing devices. For example, the second device 106 can be a multimedia computer, a laptop computer, a desktop computer, a server, grid-computing resources, a virtualized computer resource, cloud computing resource, peer-to-peer distributed computing devices, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, or embedded within a telecommunications network. The second device 106 can couple with the communication path 104 to communicate with the first device 102.

For illustrative purposes, the wireless system 100 is described with the second device 106 as a computing device, although it is understood that the second device 106 can be different types of devices. Also for illustrative purposes, the wireless system 100 is shown with the second device 106 and the first device 102 as end points of the communication path 104, although it is understood that the wireless system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wireless local area network (WLAN), wide area network (WAN), or a combination thereof.

Figure 2:
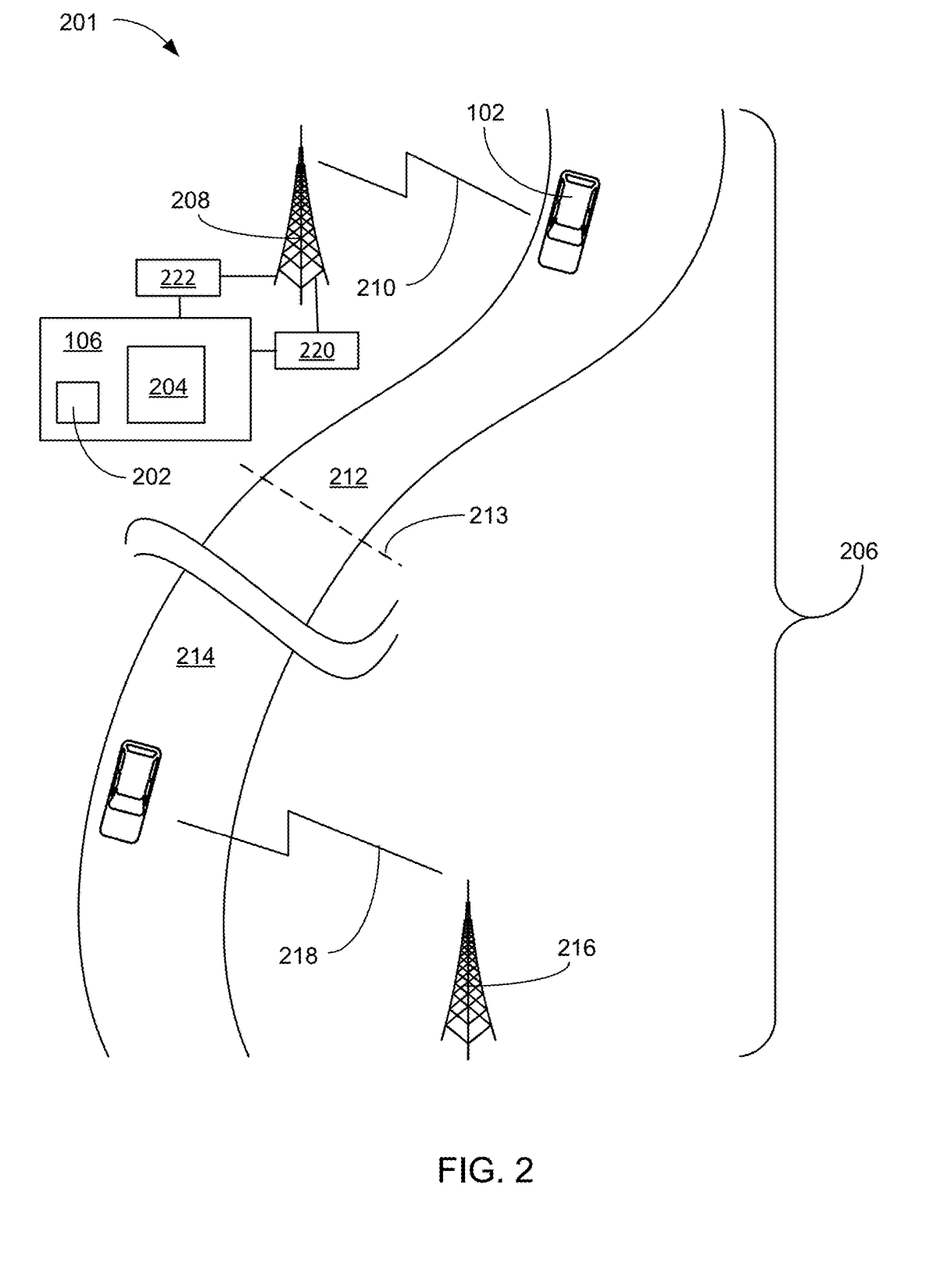
FIG. 2 is an example of an application of the wireless system of FIG. 1.

Referring now to FIG. 2, therein is shown an example of an operation 201 of the wireless system 100 of FIG. 1. The example of an operation 201 of the wireless system 100 depicts the first device 102, such as an automobile. The second device 106 can receive an update database 204 from an application (not shown). The update database 204 can be an application update, a video file, an audio file, or other file having significant size in the range of 1 gigabyte (GB) or more. If the update database 204 contains copyrighted material, an encryption key, access key, or system identifier can be needed to access the update database 204. The second device can assemble a notification packet 202 including the information necessary to access and utilize the update database 204. By way of an example, the update database 204 can be a movie requested by the first device, an update of maps for a navigation system in the first device 102, or a technical modification of the firmware associated with the systems of the first device 102. When the second device 106 has completed the assembly of the notification packet 202, the second device 106 can transmit the notification packet 202 to the first device 102.

The first device 102 can receive the notification packet 202, such as a local area network (LAN) message packet, for announcing the availability of the update database 204 that is ready for download from the second device 106. The notification packet 202 can be for downloading and accessing the update database 204. By way of an example the content of the notification packet 202 can include a transfer key code, encryption seed, database size, urgency code, system identifiers, packing codes, or a combination thereof. The notification packet 202 can be a response to a previous request, an unsolicited notification of an important update, a reminder of a periodic update, or a combination thereof.

The first device 102 can interpret the contents of the notification packet 202 in order to schedule the retrieval of the update database 204. The first device 102 can be travelling a known route or stopped to schedule a retrieval route 206 that provides maximum access to the wireless local area network (WLAN) of the communication path 104 of FIG. 1. The first device 102 schedules access to any number of locations such as a WLAN hub 208, which is a wireless antenna of the WLAN, can provide high bandwidth transfers of an update packet 210. The update packet 210 can be a portion of the update database 204. By way of an example, the first device 102 can use the retrieval route 206, travel speed of the first device 102, signal strength of the WLAN hub 208, traffic conditions, a payload size of the update database 204 to determine if transfer should commence. While travelling on a route segment 212, the first device 102 can retrieve several of the update packet 210 from the second device 106 of FIG. 1 in order to incrementally transfer the portions of the update database 204.

It is understood that the retrieval of the update database 204 can require any number of the update packet 210. The first device 102 can schedule the retrieval of each of the update packet 210 at a specific location on the retrieval route 206. Scheduling the retrieval of each of the update packet 210 can include arrangements for higher bandwidth priority from the second device 106 or from a service provider of the WLAN hub 208 along the retrieval route 206.

When the first device 102 approaches the limit of the range of the WLAN hub 208, the transfer of the update packet 210 can be paused. The transfers between the first device 102 and the WLAN hub 208 can be paused by multiple trigger conditions 213, such as weak signals, travel range, travel speed, proceeding from a red light to green light, or the like. The transfers between the first device 102 and the WLAN hub 208 can be resumed based on the recovery of the multiple trigger conditions 213 that caused the pause. It is understood that the transfers between the first device 102 and the WLAN hub 208 can resume in the next instance of the route segment 212 while connected to the next instance of the WLAN hub 208.

The first device 102 can pause or resume the transfer of the update database 204, based on the multiple trigger conditions 213, with the WLAN hub 208, as long as the first device 102 is aware of the service set identification (SSID) of the WLAN hub 208 and any login codes. The WLAN hub 208 can provide an Internet access that offers a lower subscription bandwidth 220 or a premium subscription bandwidth 222. By way of an example, the lower subscription bandwidth 220 can be less than or equal to 10 mega-bits per second (Mbps) while the premium subscription bandwidth 222 can offer a greater bandwidth. The increased bandwidth available from the premium subscription bandwidth 222 of the WLAN hub 208 can decrease the amount of time required to transfer the update database 204.

As it travels the retrieval route 206, the first device 102 transitions from one of the route segment 212 to another of the route segment 212 and eventually to a final route segment 214, the transfer of the update database 204 can be paused for a hand-off between each of the WLAN hub 208 and a final WLAN hub 216. The hand-off can occur when the first device 102 is travelling along the route segment 212 and meets the multiple trigger conditions 213 required to pause the transfer to the update database 204. When the first device 102 enters the next in the sequence of the route segment 212 and the multiple trigger conditions 213 are again met, the transfer can be resumed as the transfer is handed-off to the WLAN hub 208 associated with the current one of the route segment 212. As the first device 102 enters the route segment 212 the multiple trigger conditions 213 can be met in order to commence transfer of the update packet 210.

When the first device 102 enters the final route segment 214, of the retrieval route 206, and the multiple trigger conditions 213 are met the transfer of the update database 204 can be resumed until completion. The final WLAN hub 216 can transfer any number of the update packet 210 and a final update packet 218 in order to complete the transfer of the update database 204. When the update database 204 has been completely transferred, the first device 102 can process the update database 204, using the encryption seed and packing codes from the notification packet 202, in order to apply the contents of the update database 204 to the appropriate client systems within the first device 102.

By way of an example, the update database 204 can include an upgrade of the maps, points of interest, algorithms, prompts, and other items associated with navigation guidance of a navigation client within the first device 102. The update database 204 can contain video content for an entertainment client, extended diagnostics for a control unit of the first device 102, an emergency update for a safety control client, or a combination thereof.

It has been discovered that the wireless system 100 can perform a piece-meal transfer, by pausing and resuming the transfer of the update database 204, while the first device 102 travels along the retrieval route 206. As the first device 102 moves through a number of the route segment 212 to the final route segment 214, the transfer of a number of the update packet 210 and the final update packet 218 can incrementally transfer the update database 204 into the first device 102. The transfer of the update database 204 can be at the request of the operator of the first device 102 or it can be unsolicited as a periodic or emergency update of the client systems within the first device 102.

It is understood that the wireless system 100 can manage the transfer of the update database 204 having a large size, for example 100's of megabytes to several gigabytes. The notification packet 202 can establish a level of urgency of the transfer of the update database 204 without intervention or knowledge of the operator of the first device 102. The notification packet 202 can define encryption criteria and access rules for copyrighted material, such as movies, that can be transferred to the first device 102 as the content of the update database 204. In instances where several of the client systems within the first device 102 have an update pending, the notification packet 202 can provide a packing order and size for distribution of portions of the update database 204 to the appropriate client systems.

In some circumstances, such as rural travel, a complete transfer of the update database 204 can span multiple days based on the availability of the WLAN hub 208 or the final WLAN hub 216. In most cases and in urban environments the update database 204 can be completely transferred in a range of a few minutes to several hours. In an emergency update, which can include the update of safety systems within the first device 102, the accessary power to the wireless system 100 can be maintained after the system power has been switched off, in order to continue the transfer of the update database 204, provided the first device 102 remains within access range of the WLAN hub 208 or the final WLAN hub 216.

Figure 3:
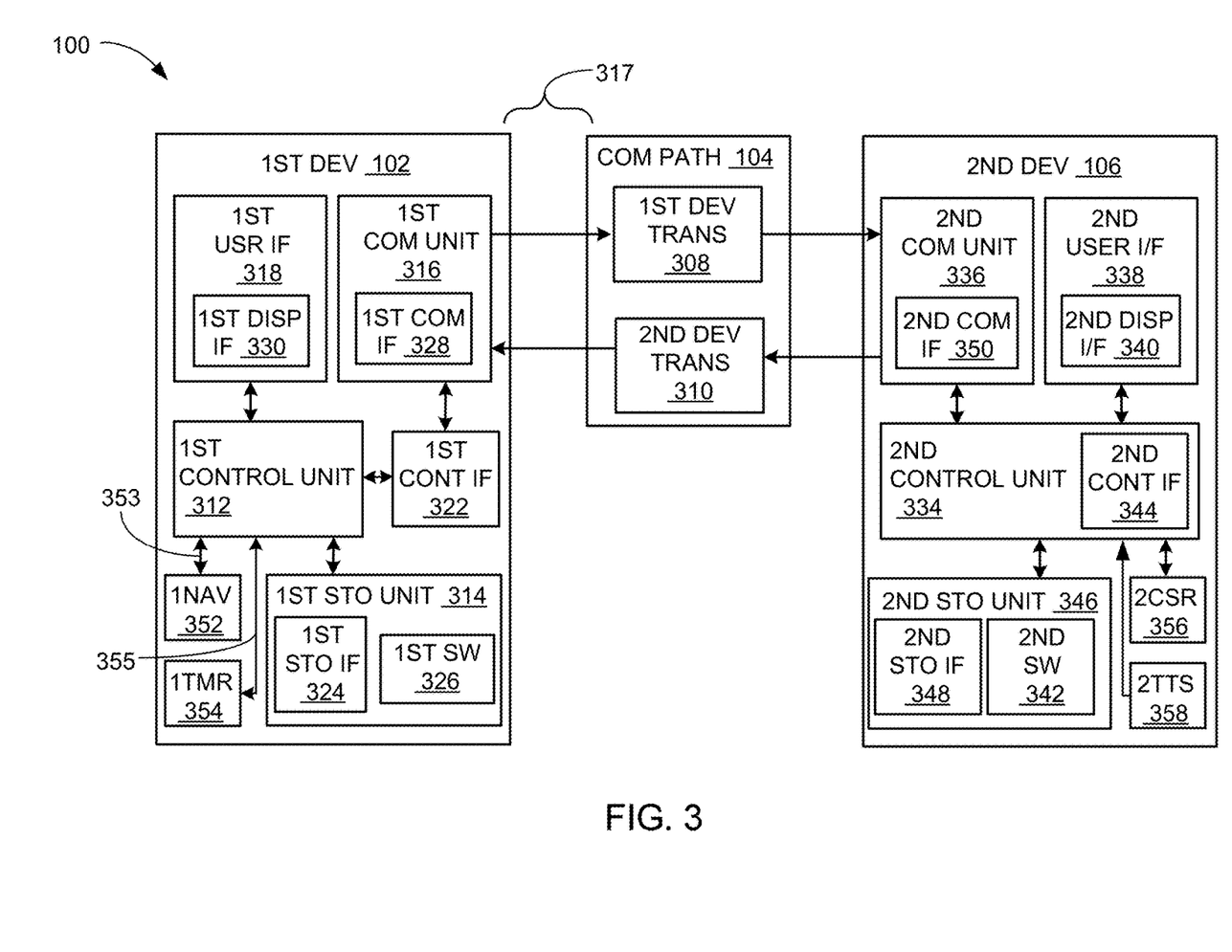
FIG. 3 is an exemplary hardware block diagram of the wireless system.

Referring now to FIG. 3, therein is shown an exemplary hardware block diagram of the wireless system 100. The wireless system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the wireless system 100 is shown with the first device 102 as a client device, although it is understood that the wireless system 100 can have the first device 102 as a different type of device. For example, the first device 102 can be a mobile server having a number of clients including a display interface for displaying the relevant information.

Also for illustrative purposes, the wireless system 100 is shown with the second device 106 as a server, although it is understood that the wireless system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide a portion of the intelligence of the wireless system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, the notification packet 202 of FIG. 2, the update database 204 of FIG. 2, data representing previously presented image, sound files, coupons, advertisements, sale notices, favorite functions, directions, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between other functional units in the first device 102. The first storage interface 324 can also be used for communication that is external to the first device 102, such as external memory, solid state disk drives, or external hard disk drives.

The first storage interface 324 can receive information from the other functional units or from external sources, or can transmit information to the other functional units or to external destinations. The external sources and the external destinations refer to sources and destinations external to the first device 102 or temporarily housed within the first device 102 and can be removed.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104 a wireless channel 317.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can be configured to operate the first user interface 318 to display information generated by the wireless system 100. The first control unit 312 can also execute the first software 326 for the other functions of the wireless system 100. The first control unit 312 can further execute the first software 326 for interaction with the communication path 104 via the first communication unit 316 and the wireless channel 317.

The second device 106 can be optimized for implementing an embodiment of the present invention in a multiple device embodiment with the first device 102. The second device 106 can provide the additional or higher performance processing power compared to the first device 102. The second device 106 can converge relevant information for several of the first device 102 in order to provide groups of targeted users of the first device 102 that share common categories of the relevant information. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the wireless system 100. The second software 342 can operate in conjunction with the first software 326 to execute the modules of the wireless system 100. The second control unit 334 can provide additional performance compared to the first control unit 312.

The second control unit 334 can operate the second user interface 338 to display information. The second control unit 334 can also execute the second software 342 for the other functions of the wireless system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, the notification packet 202, the update database 204, or a combination thereof. The second storage unit 346 can be sized to provide the additional storage capacity to supplement the first storage unit 314. The second storage unit 346 can also receive input from other sources for delivery to the first device 102 through the communication path 104.

For illustrative purposes, the second storage unit 346 is shown as a single element, although it is understood that the second storage unit 346 can be a distribution of storage elements. Also for illustrative purposes, the wireless system 100 is shown with the second storage unit 346 as a single hierarchy storage system, although it is understood that the wireless system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

A first location unit 352 can determine a device location 353 of the first device 102 by communication with a global positioning satellite. The first location unit 352 can receive updated information, from the update database 204, such as satellite frequencies, map files, points of interest files, modified routing algorithms, or the like. The location unit 352 can establish the retrieval route 206 of FIG. 2 in response to receiving the notification packet 202 by the first control unit 312. The device location 353 can be passed to the first control unit 312 for display on the first user interface 318 for presenting routing and destination information for the first device 102. Information from the update database 204 can modify the information sent to the first display interface 330 and can include graphic updates, audio updates, or a combination thereof.

A first timer module 354 can be coupled to the first control unit 312. The first timer module 354 can be used to monitor durations of time between events of interest to the first control unit 312. The first timer module 354 can be scaled to measure time intervals from seconds to months and can be used in multiple processes concurrently. The first timer module 354 can measure the time between the route segment 212 and the last route segment 214 to access the update database 204 or it can be used to verify an extended period of time, such as days, weeks, or months, for requesting periodic updates or reserved downloads of copyrighted material. The first timer module 354 can provide a time indicator 355, such as a time stamp or system clock for the first control unit 312 to associate with events of interest. The time indicator 355 can be used in conjunction with the content of the notification packet 202 to establish encryption keys or as an identifier used in the pause and resumption of the transfers of the update database 204.

It will be understood that the modules of the first device 102 can be combined to operate as the client modules of the first device 102. For example, the client navigation module can be performed by combining the first control unit 312, the first location unit 352, the first storage unit 314, and the first user interface 318. The client entertainment module can be performed by combining the first control unit 312, the first storage unit 314, and the first user interface 318. The client safety module can be performed by combining the first control unit 312, the first communication interface 328, the first storage unit 314, and the first control interface 322, which is in control of switches and sensors throughout the first device 102.

The first communication unit 316 can couple with the communication path 104 through the wireless channel 317 to send information to the second device 106 in the first device transmission 308. The second device 106 can receive information in the second communication unit 336 from the first device transmission 308 of the communication path 104.

The second communication unit 336 can couple with the communication path 104 to send the relevant information to the first device 102 in the second device transmission 310 through the wireless channel 317. The first device 102 can receive the relevant information in the first communication unit 316 from the second device transmission 310 of the communication path 104. The wireless system 100 can be supported by the first control unit 312, the second control unit 334, dedicated hardware modules, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the wireless system 100 is described by operation of the first device 102 and the second device 106. It is understood that the first device 102 and the second device 106 can operate any of the modules and functions of the wireless system 100.

It has been discovered that the first device 102 can respond to the notification packet 202 through the communication path 104 without intervention by the user of the first device 102. The first control unit 312 and the second control unit 334 can execute portions of the transfer of the update database 204 without the assistance of the user of the first device 102 by performing a piece-meal transfer of the update database 204 as the first device 102 travels along the retrieval route 206 and is in communication with the WLAN hub 208 of FIG. 2 or the final WLAN hub 216 of FIG. 2.

Figure 4:
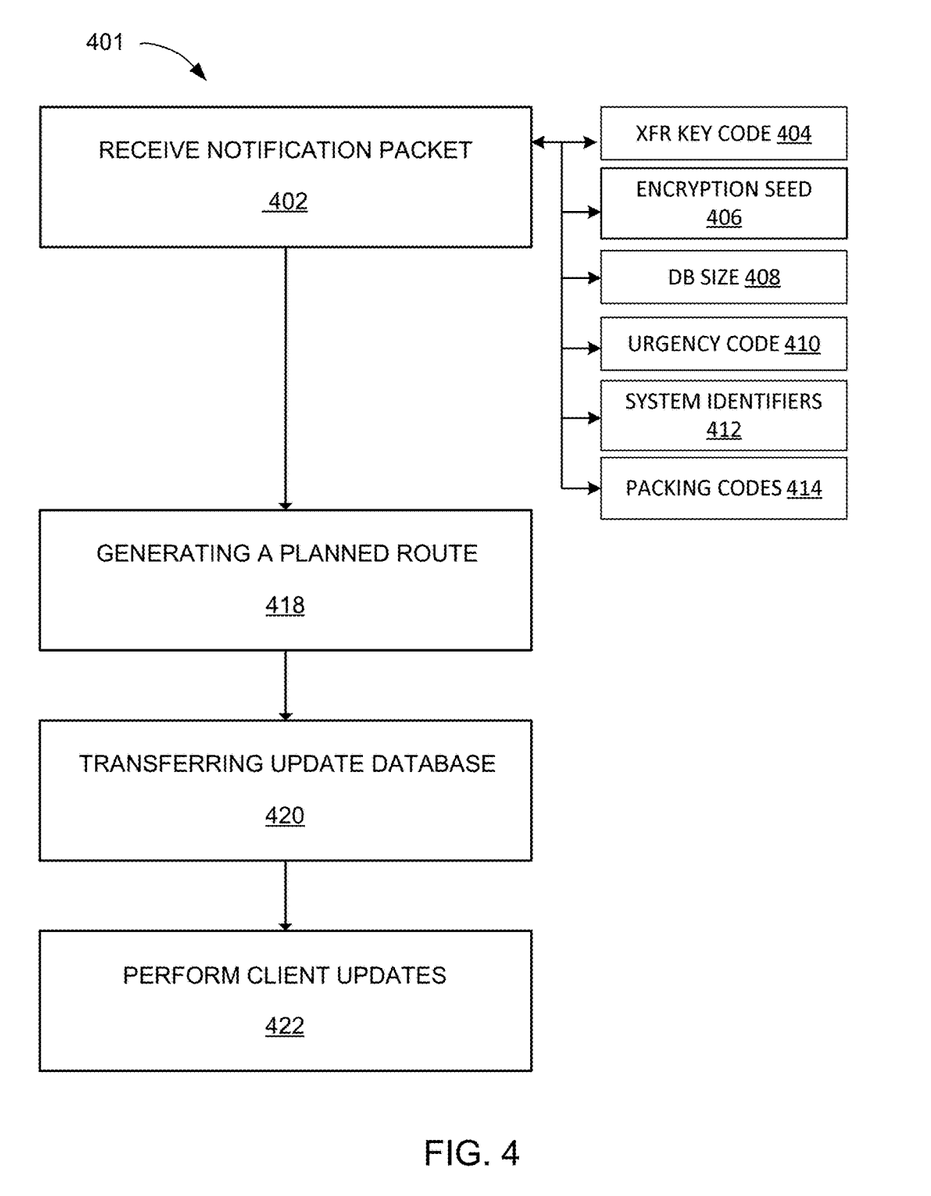
FIG. 4 is a control flow of the wireless system of FIG. 1.

Referring now to FIG. 4, therein is shown a control flow 401 of the wireless system 100 of FIG. 1. The control flow 401 of the wireless system 100 depicts a receive notification packet module 402, in which the second device 106 of FIG. 1 sends the notification packet 202 of FIG. 2 through the WLAN hub 208 of FIG. 2 to the first device 102 of FIG. 1. The notification packet 202 can alert the first control unit 312 of FIG. 3 that the update database 204 of FIG. 2 is available for the first device 102.

The notification packet 202 can be parsed for storing information about the update database 204 that is pending transfer. The notification packet 202 can include parameters significant to the update database 204, which can include for example a transfer key code 404, a data protection 406, a database size 408, an urgency code 410, system identifiers 412, packing codes 414, or a combination thereof. The transfer key code 404 can be used to identify what type of information is included in the update database 204, such as new navigation maps, a movie, new instructions for the client safety module, new control code for the user display interface 330 of FIG. 3, or the like. The data protection 406, such as an encryption seed, can be combined with the information already present in the first device 102 in order to provide protection for copyrighted or proprietary information, for example an encryption algorithm or access/registration key, which can be used to protect copy righted material, such as a movie or the new map set. The database size 408 can allow the first device 102 to store the update database 204 as it is transferred from the second device 106. The urgency code 410 can establish the priority of the transfer of the update database 204. The urgency code 410 can influence the management of the wireless system 100 in order to complete the transfer of the update database 204. The system identifiers 412 can provide a list of the client systems that are impacted by the contents of the update database 204. The packing codes 414 can communicate an individual size of the updates that are included for each of the client systems identified in the system identifiers 412.

Once the notification packet 202 is parsed, the first location unit 352 of FIG. 3 can be set-up in preparation for entry to a generate planned route module 418. The generate planned route module 418 can apply the resources of the first control unit 312, the first location unit 352 and the first storage unit 314 of FIG. 3 in order to pick the retrieval route 206 of FIG. 2. It is understood that the first device 102 can be travelling a daily route when the notification packet 202 is received. The retrieval route 206 can be calculated to coincide with the daily route. The selection of the retrieval route 206 can be influenced by the urgency code 410 and the availability of the WLAN hub 208 of FIG. 2 or the final WLAN hub 216 of FIG. 2 to complete the transfer of the update database 204. The retrieval route 206 must be calculated to provide sufficient access to the WLAN hub 208 or the final WLAN hub 216 to complete the transfer of the update database 204 in an appropriate amount of time.

A transferring update database module 420 can initiate the transfer of the update database 204 as soon as the retrieval route 206 is initiated. The retrieval route 206 can be presented to the user of the first device 102 in order to access the retrieval route 206. It is understood that the retrieval route 206 can be a normally travelled route for the first device 102, but a schedule of transfers from the WLAN hub 208 or the final WLAN hub 216 can be included along the route. With the first device 102 travelling on the retrieval route 206, the first device 102 can initiate the transfers from the WLAN hub 208 or the final WLAN hub 216 in order to complete the piece-meal transfer of the update database 204.

A perform client updates module 422 can be entered when the update database 204 has been completely transferred and loaded into the first storage unit 314. The first device 102 can open the update database 204, apply the data protection 406, if necessary, to decrypt the content of the update database 204, and distribute the update to the client systems called out by the system identifiers 412 in the sizes specified by the packing codes 414. It is understood that the client systems of the first device 102 can be sequences of firmware that invoke the first control unit 312 to activate other of the hardware units in the first device 102 to provide the client system. By copying the content of the update database 204 to the appropriate area of the first software 326 of FIG. 3 utilized by the client system, the updated functions of the client system can be provided.

It is understood that the contents of the notification packet 202 is an example only for the description of the operation of the wireless system 100 and other contents may be included in the notification packet 202 and any of the parameters listed can be left out. The format and content of the notification packet 202 can vary by implementation. In the event of a periodic update, the first timer module 354 of FIG. 3 can provide the stimulus for initiating the transfer of the update database 204 without receiving the notification packet 202. The description of the announcement of a pending transfer of the update database 204 is not intended to limit the invention, but is used to establish understanding of the capabilities of the wireless system 100.

It has been discovered that the wireless system 100 provides an efficient means to alter the operation of the client systems within the first device 102, such as an automobile. The delivery of the update database 204 can provide corrections to deficiencies detected in the operation of the first device 102 or deliver the latest movie for viewing by the passengers within the first device 102. The flexibility provided by the transfer of the update database 204 can provide a way for automobile manufacturers to refresh the client systems of the first device 102 without requiring the user of the first device 102 to be inconvenienced by the update process. Further the ability of the update database 204 to transfer copyright protected material to the first device 102 can establish a new market for "on-the-road" entertainment.

The wireless system 100 has been described with module functions or order as an example. The wireless system 100 can partition the modules differently or order the modules differently. For example, each of the client systems defined in the specification can have a hardware module that is micro-programmed in order to provide the specific service for the client system.

The modules described in this application can be hardware implementation or hardware accelerators in the first device 102 or in the second device 106. The physical transformation from update database 204 results in the movement in the physical world, such as travelling the retrieval route 206 for interacting with the WLAN hub 208 or the final WLAN hub 216. Movement in the physical world results in changes to the operation of the first device 102 by altering the client systems within the first device 102 or providing entertainment in the form of a movie for display through the first display interface 330 of FIG. 3.

Figure 5:
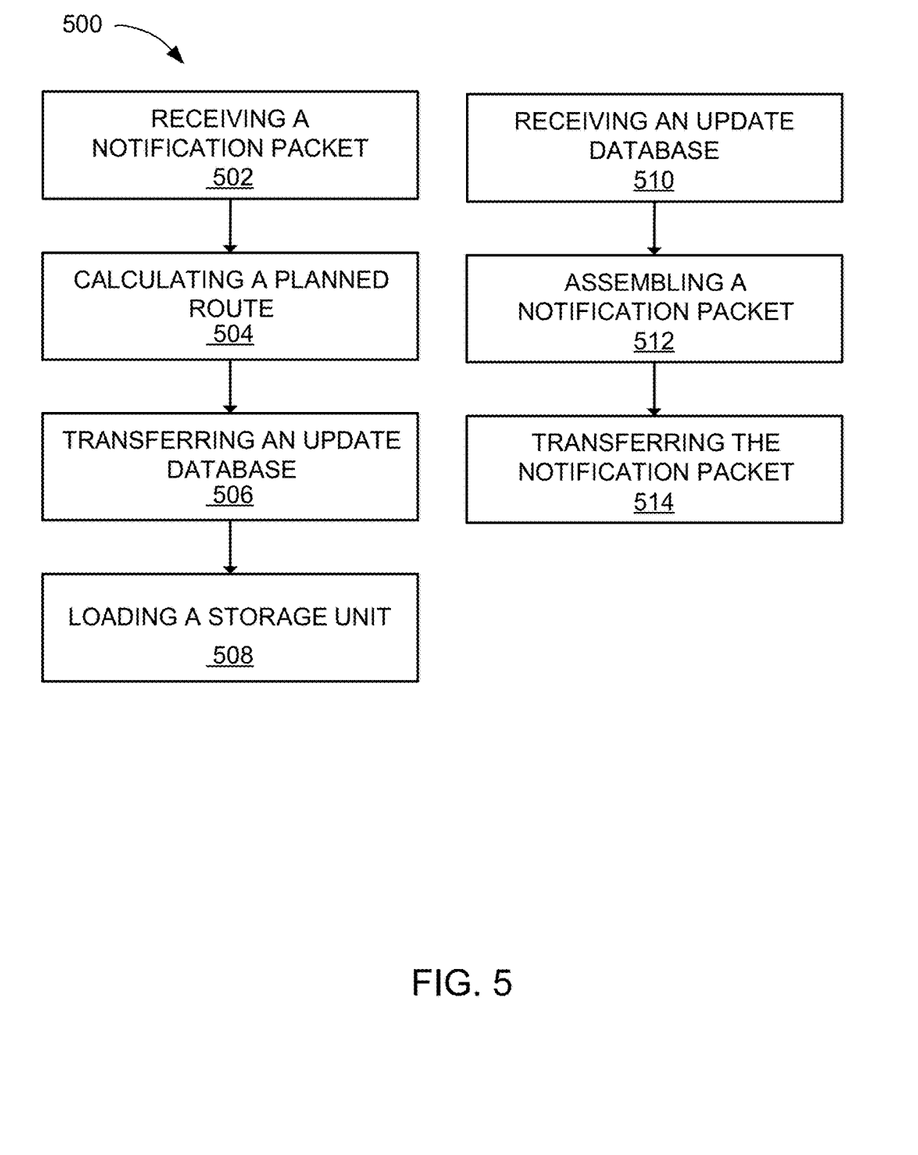
FIG. 5 is a flow chart of a method of operation of a wireless system in an embodiment of the present invention.

Referring now to FIG. 5, therein is shown a flow chart of a method 500 of operation of a wireless system 100 in an embodiment of the present invention. The method 500 includes: receiving a notification packet in a block 502; calculating a planned route based on the content of the notification packet in a block 504; transferring an update database while travelling the planned route in a block 506; and loading a storage unit with the content of the update database for displaying on a device in a block 508.

The method 500 of operation of the wireless system 100 also includes: receiving an update database in a block 510; assembling a notification packet for the update database including: generating a transfer key code for accessing the update database, encrypting, with an encryption seed, the update database, and providing a database size for the update database in a block 512; and transferring the notification packet to a device in a block 514.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:
1. A method of operation of a wireless system comprising:
receiving an update database;

assembling a notification packet for the update database including:
  generating a transfer key code for accessing the update database,
  encrypting, with an encryption seed, the update database, and
  providing a database size for the update database; and
transferring the notification packet to a device including enabling the device, with the notification packet, for transferring and accessing the update database based on the notification packet.

2. The method as claimed in claim 1 wherein transferring the notification packet to the device includes communicating through a WLAN hub for transferring the update database.

3. The method as claimed in claim 1 wherein assembling the notification packet includes providing an urgency code in the notification packet.

4. The method as claimed in claim 1 further comprising transferring the update database including pausing the transfer by the device.

5. The method as claimed in claim 1 further comprising transferring the update database includes pausing the transfer to a WLAN hub and resuming the transfer to a final WLAN hub for completing the transfer of the update database.

6. A method of operation of a wireless system comprising:
  receiving a notification packet through a wireless channel;
  calculating a retrieval route based on the content of the notification packet including identifying a final WLAN hub accessible from the retrieval route;
  transferring an update database, based on the notification packet, while travelling the retrieval route including receiving a final update packet from the final WLAN hub through the wireless channel; and
  loading a storage unit with the content of the update database accessed using the notification package including copying the content to a display interface for displaying on a device.

7. The method as claimed in claim 6 further comprising accessing a WLAN hub for transferring the update database including receiving an update packet.

8. The method as claimed in claim 6 wherein calculating the retrieval route includes extracting an urgency code and a database size from the notification packet.

9. The method as claimed in claim 6 wherein transferring the update database includes accessing a WLAN hub while travelling a route segment of the retrieval route including pausing the transfer by the device and travelling to a final route segment.

10. The method as claimed in claim 6 wherein transferring the update database includes pausing a WLAN hub for transferring the update database and resuming on the final WLAN hub for transferring the update database to the storage unit.

11. A wireless system comprising:
  a communication interface for receiving a notification packet;
  a control unit, coupled to the communication interface, configured to calculate a retrieval route based on the content of the notification packet;
  a controller interface, coupled to the communication interface, for transferring an update database, based on the notification packet, while travelling the retrieval route; and
  a storage unit, coupled to the control unit, loaded with the update database, accessed using the notification packet, for displaying on a device.

12. The system as claimed in claim 11 wherein the communication interface for coupling a WLAN hub for transferring the update database.

13. The system as claimed in claim 11 further comprising a location unit coupled to the control unit for calculating the retrieval route includes the control unit extracting an urgency code from the notification packet to determine the retrieval route.

14. The system as claimed in claim 11 wherein the controller interface is for transferring the update database from a WLAN hub while travelling a route segment of the retrieval route including the transfer paused by the device.

15. The system as claimed in claim 11 wherein the controller interface is for transferring the update database includes the transfer from a WLAN hub paused by the device and the transfer from a final WLAN hub resumed for transferring the update database.

16. The system as claimed in claim 11 further comprising:
  a final WLAN hub electrically coupled to the communication interface for receiving a final update packet along the retrieval route; and
  a display interface for displaying the content of the update database after the final update packet received.

17. The system as claimed in claim 16 further comprising a WLAN hub accessed for transferring the update database; and
  wherein:
  the communication interface is electrically coupled to the WLAN hub for receiving an update packet.

18. The system as claimed in claim 16 further comprising a location unit coupled to the control unit for calculating the retrieval route includes the control unit extracting an urgency code and a database size from the notification packet to determine the retrieval route.

19. The system as claimed in claim 16 wherein the controller interface is for transferring the update database from a WLAN hub while travelling a route segment of the retrieval route including the transfer paused by the device and the transfer completed, while travelling a final route segment, from a final WLAN hub.

20. The system as claimed in claim 16 wherein the controller interface is for transferring the update database from a WLAN hub is paused by the device and the transfer is resumed from a final WLAN hub for transferring a final update packet to the storage unit.

* * * * *